United States Patent [11] 3,617,353

[72] Inventor William J. Cooney
 North Providence, R.I.
[21] Appl. No. 733,794
[22] Filed June 3, 1968
[45] Patented Nov. 2, 1971
[73] Assignee Chas. S. Tanner Co.
 Warwick, R.I.

[54] SOIL RELEASE CHEMICALS AND METHOD OF APPLICATION TO GLASS FABRIC OR FIBER
 5 Claims, No Drawings
[52] U.S. Cl............................................. 117/76 T,
 117/139.5 A, 117/126 GB, 117/126 GS
[51] Int. Cl............................................. C03c 25/02,
 B32b 17/04
[50] Field of Search................................. 117/126
 GR, 126 GS, 76 T, 139.5 A

[56] References Cited
 UNITED STATES PATENTS
 3,311,582 3/1967 Sparks et al. ............... 117/126 X
 3,444,116 5/1969 Gagnon et al................ 117/126 X
 3,476,580 11/1969 Jinnette........................ 117/76 X Primary Examiner—William D. Martin
Assistant Examiner—D. Cohen
Attorney—Thomas B. Graham ABSTRACT: Soil release for application to glass fibers and fabrics which have been treated with acrylic resin, or acrylic resins, and dyes to give the fibers a base coat, which soil release comprises an aqueous emulsion of copolymers of acrylic or methacrylic acids with ester of acrylic or methacrylic acid, wherein the proportion of acid is high, ranging from about 25 to 80 percent acid, by weight, in combination with an aqueous solution of a nonyl or octyl phenol, reacted with from 9 to about 50 moles of ethylene oxide, and aqueous solution of a fatty alcohol or acid, which also has been reacted with 5 to 50 percent of ethylene oxide, the composition thus prepared being used as a finish bath treatment for glass fibers which have already been dyed or had a base color coating applied thereto, thereby to apply over the base color layer on a glass fiber or fabric a second molecular or semimolecular layer of this resinous material, which functions as a soil release and, also, by controlling the base dye system and amount of soil release obtain a fabric which is flame retardant.

3,617,353

SOIL RELEASE CHEMICALS AND METHOD OF APPLICATION TO GLASS FABRIC OR FIBER

THE BACKGROUND OF THE INVENTION

Fabrics made of glass fiber have the very desirable characteristic that they are durable and for use in public institutions as drapery fabrics, upholstery fabrics or as tablecloths, they have the advantage of being nonflammable. They also inherently will not absorb soil, but it appears that the base surface treatments necessitated to permit coloring the fabrics will hold soil and also will be flammable, thereby neutralizing one of the advantages of the glass. Hence, it is conventional on the textile industry to employ formulations designed to impart some soil release characteristic to glass fiber fabrics, so that stains which in use are taken on by the fabrics can easily be removed by machine washing. However, accompanying the soil release characteristic of virtually all glass fibers, and fabrics made from glass fiber, is the flammability of the coating material. That is, generally, an organic resinous material and other balancing ingredients are used for the color coating and as a consequence the inherent flammability of organic materials is encountered.

It is most desirable, that a finish applied over a fabric made of glass fiber be durable to machine washing and that it be one which gives good soil release characteristics. By this is meant that the stains normally encountered in daily usage in such places as restaurants should be easily removed. The property of soil release and nonflammability measured in terms of durability to machine washing should have a life approximately that of the fabric. Furthermore, the fabric should show good wrinkle recovery and, obviously, like any fabric used, it should have a pleasant hand.

Of the collection of properties it is desirable to develop in the fabric the one of nonflammability or nonflame propagation over the surface of the fabric is most important. It has been noted, of course, that it is obvious that the glass fiber itself is not flammable. It is only the coating material or the deposit formed in surface treatment which will support combustion and will give the appearance of flammability to the fabric.

It is accordingly a fundamental object of this invention to provide a system for treating glass fibers and fabrics to give them the virtues of good soil release which soil release has durability to washing, wrinkle recovery and and the other general physical characteristics desirabie for a textile, coupled with the fact that the fabric will not be flammable nor will the surface treatment be flammable or support combustion. Such a fabric will be virtually ideal for application as a upholstery fabric, drapery fabric, and tablecloth fabric for use in places of public assembly.

It is another object of the invention to provide a method for employing these chemical treatments for the glass fabric, such that, even though the chemicals themselves are flammable, their application under careful conditions of the process on the fabric will induce the information of a surface finish having all the desirable properties of the soil release as well as nonflammability.

Other objects and advantages of the invention will in part be obvious and in part appear hereinafter.

DETAILED DESCRIPTION OF THE INVENTION

In the description of the invention herein it is to be understood that glass fibers and fabrics are used interchangeably and the chemistry is concerned with the surfaces.

The theory of may finish for the glass fiber is to convert a lyophilic and hydrophobic surface, i.e., textile which is glass, to one which is hydrophilic, which conversion is done so that the fiber is wet by water and surfactant preferentially, so that any oil or grease which may be adhering to its surface is removed. The finished system which I have devised for accomplishing this result is based on the following:

In view of the fact that bare glass fibers as such will not retain the stains ordinarily encountered in use in domestic and public installations it must be the pigment binding acrylic acid resins, softeners and coupling agents which form the carrying medium for a color finish in the glass surface which are the source of the problem. This finish system or base coat, therefore, at its best must limit the effectiveness of the finished surface to hold stains and, by appropriate application of base material to the glass fiber itself and overlaying the base material with a hydrophilic system, I am able to achieve the result that I develop all the properties useful for obtaining durability to machine washing and soil release, and I gain the extra bonus of nonflammability of the surface finish on the fibers.

Accordingly, the system of preparing glass fabrics for soil release and nonflammability in accordance with this invention is basically a two-step chemical treatment, followed by the conventional physical finishing. Fundamental to the operation is the two-step chemical application of essentially two coats to glass fiber, the first step being the application of a base finish as follows:

1. It consists of an acrylic latex essentially in the form of aqueous emulsion in water. Included with this is a softener which commonly will be in the form of a silicone compound. A metal salt catalyst is included. Furthermore, a coupling agent and a pigment which can be any color used on the fabric is part of the bath composition. The whole is then made up with water to the appropriate volume and concentration of solid ingredients. The base coat thus consists of an emulsion of water and acrylic copolymers, glass reactive chemicals for adherence to the glass surface, silicone emulsion for softening, and may contain a commercial pigment dye. The base finish applied to a glass fabric by padding gives the fabric its color and over this is applied a top finish which gives the property of soil release and nonflammability.

2. The top coat system is composed of three ingredients identified as an aqueous emulsion of an acrylic resin, as copolymer of acrylic or methacrylic acids with esters of acrylic or methacrylic acids, wherein the percentage of the acid is quite high, namely. ranging from about 25 to 80 percent acid, by mole percent, with a proportion of nonyl or octyl phenol reacted with ethylene oxide; and a third component which consists of a fatty alcohol or acid reacted with ethylene oxide. This composition is prepared in relatively dilute form and should add no more than 1 to 1 ½ percent by weight of solids to the fabric so that total combined solids on the fabric contributed by the base coat (1) and top coat (2) does not exceed about 4 percent to 4½ percent at this point.

In processing the fabric to apply the first coat the fabric is padded through a bath carrying the acrylic binder, glass reactive chemical, and softener, and in appropriate cases a pigment dye; it is held at room temperature; the fabric is squeezed through pad rollers set at 40 lbs. per sq. inch and dried and cured at 350° F. (175° C.) for 1½ minute.

The second coat or the top coat is then applied to the fabric. The second coat consists of acrylic and methacrylic acid with esters of acrylic and methacrylic acids, wherein the percentage of the acids is quite high, nonyl phenol ethylene oxide condensate, and the fatty acid ester or alcohol reacted with ethylene oxide. The second bath is applied to the fabric at 50–122° F. (10–50° C.), the fabric then is squeezed through pad rollers set at 30 lbs. per sq. inch and dried and cured at 280–300°F. (135–150°C.) for 1½ minute. Because the top coat contains certain volatile ingredients, it is necessary to pass the fabric through a hot water bath to render it noncombustible. Essentially this is merely removal of combustible volatile material.

Generally the fabric is best treated by passing it through a padder, a conventional piece of equipment in any textile treating plant, which contains water heated to about 190° F. Generally the water bath should be clear and occasionally it calls for replacement to neutralize the accumulation of volatiles from the padder.

Treated in this fashion the fabric, after scouring, carried 3¼ to 3½ percent, by weight, of added organic matter, but however, the fabrics thus treated were rated non combustible and nonflammable by the OWENS CORNING FIBERGLASS test method for flammability.

EXAMPLE

The processing of the fabric is best described in detail as follows:

1. The base finish is applied to a conventional glass fiber fabric using a conventional padder set for 30 to 50 pounds per sq. inch roll pressure on yarn fabrics of 401 gauge with 30 pounds per sq. inch for continuous yarn fabrics. After application of the base finish the fabric is rinsed and the finish is cured at 350° F. for approximately 1½ minutes.

2. The second, or top finish, is supplied using conventional padding equipment set for about 30 to 50 pounds per sq. inch for the 401 yarn fabrics or about 25 pounds per sq. inch for continuous yarn fabrics.

The finish is formulated as described in the following tabulation and the finish, thereafter, is cured for 1½ minutes at 280° F. to about 300° F. It is important to observe that the curing time and temperature are an interval which is important to the development of the nonflammable property desired, because overcuring or undercuring will be detrimental to the performance of the soil release coat finish.

3. Following the application of the soil release coat finish and its cure the material is passed through a hot water bath held at approximately 190° F. and passed through a roll set for pressure about 30 pounds per sq. inch. Fabric is then held at a temperature of 275° F. for 1½ minutes or it is held at this temperature until it is dry.

By processing the fabric in this fashion I have found it possible to develop through the use of the base coat the top coat and the final hardening finish step a unified finish on the fabric, which is manifested in a finished fabric characterized by the fact that it is nonflammable in the sense of not propagating flame and yet it retains all the desirable characteristics of the fabric for use in conventional interior installations in places of public assembly.

A more detailed understanding of the invention can be had by reference to the data in the following examples.

It is to be understood that the tabulation of the examples represents a sequence of tests and that the techniques, wherever padding or drying are referred to, are the conventional ones.

It is the composition of the coating bath, the finishing bath, and the treatment steps related thereto and to each other which characterize the invention;

Accordingly the following illustrative the properties which can be developed in the glass fibers treated in accordance with the invention;

These materials form a durable soil release on glass fabric and by proper control of the ingredients a fabric that is flame retardant is produced as indicated by the following:

EXAMPLES

Woven fiber glass fabric was padded with the following coloring compositions as a base coat:

| Formula | No. 1 % | No. 2 % | No. 3 % |
|---|---|---|---|
| Padding Pigment Dispersion | | | |
| Yellow | 2 | | |
| Pink | | 2 | |
| White | | | — |
| Acrylic Resin | 7.5 | 7.5 | 7.5 |
| Silicone Softener | 10 | 10 | 10 |
| Metal Salt Catalyst* | 1 | | 1 |
| Water | 79.5 | 79.5 | 79.5 |

*As catalyst, zinc nitrate, zinc chloride, magnesium chloride are accepted as conventional. They became effective at their disassociation temperatures, i.e. about 325°

F.

The fiber glass was dried at about 250°–300° F. for 1–1½ minutes and cured at about 325° F. for about 90 seconds. The catalyst salt disassociates forms acids, and induces reaction on the fibers. Then the base coated fabric was padded through the following formulations:

| Formula | % 1 | % 2 | % 3 | % 4 | % 5 | % 6 |
|---|---|---|---|---|---|---|
| Acrylic or Methacrylic emulsions | 14 | 7 | 5 | 20 | 14 | 14 |
| Nonyl phenol ethylene oxide condensate | 4 | 2 | 1 | 1 | | 4 |
| Fatty acid ester with ethylene oxide | 1 | 0.5 | 0.5 | 0.5 | | 4 |

The glass fabric was dried at temperatures of 250° F. to 275° F. and then tested for soil release.

Fabric samples of about one yard square, where stained with butter, Wesson oil, Mazola, margerine, grape juice, (tomato) spaghetti sauce, mustard, salad dressing, beet juice, coffee, ketchup, and chocolate. These represent a good sampling of typical common soils encountered in restaurants.

They were allowed to stand for over 30 minutes after being soiled and washed in a home washing machine. The finish is durable to 15 washings.

All stains were removed.

Flammability with glass fibers is entirely a different problem from flammability with natural fibers. The glass fiber will not burn, but in order to obtain a desirable fabric it has to be dyed and treated with organic chemicals. These chemicals in many cases can cause the fabric to appear to burn, but it is only the treatment chemicals which burn. In order to produce a nonflammable soil release finish, it is necessary carefully to control the materials applied in dyeing and the soil release finish.

Commercial soil release finishes now applied to glass fabric are usually very flammable and do not use the materials specified herein.

In order to evaluate the flammability of the glass fabric treated in accordance with my invention compared with commercially available materials, I used the following the tests:

No. 1 ASTM-D1230-61 (24)
No. 2 AATCC-33-1962
No. 3 AATCC-34-1966 No. 4 Modified AATCC-34-1966

Number 4 was a modification of AATCC-34-1966 in which the flame was one half inch long and was removed as soon as any burning took place. Many materials which will not burn under test AATCC-34-1966 will burn completely up the whole length of sample under the modified test. Under all these tests we also report surface scorch.

Fabric No. 1 designated in the following tests is a texturized Beta glass fabric dyed with formula No. 2 and soil release formula No. 2.

Fabric No. 2 designated in the following tests is a filament glass fabric dyed with formula No. 2 and soil release formula No. 1.

Fabric No. 3 is a commercial fiber glass fabric with a commercial soil release finish.

TEST METHOD

ASTM-D1230-61

| Fabric | Flame Spread | Base Fabric |
|---|---|---|
| No. 1 | No flame spread | Undamaged |
| No. 2 | No flame spread | Undamaged |
| No. 3 | Extinguished | Undamaged |

TEST METHOD

AATCC-33-1962

| Fabric | Results | Comments |

| | | | |
|---|---|---|---|
| No. 1 | DN | | |
| No. 2 | DN | | |
| No. 3 | 1 BE | 1" Circle charred | |

TEST METHOD

AATCC-34-1966

| Fabric | Surface Scorch | After Flame Seconds | After Glow Seconds | Char Length |
|---|---|---|---|---|
| No. 1 | 2¼" | 0 | 2 | ½" |
| No. 2 | 2½" | 0 | 3 | ½" |
| No. 3 | BURNED TO END OF FABRIC | | | |

TEST METHOD

MODIFIED AATCC-34-1966

| Fabric | After Flame Seconds | After Glow Seconds | Surface Char |
|---|---|---|---|
| No. 1 | 1 | 1 | ¾" |
| No. 2 | 1 | 1 | 182" |
| No. 3 | Burned The Complete Length of Fabric | | |

The above tests demonstrate that a flame retardant fabric which will not support combustion can be produced with excellent soil release by proceeding in accordance with my invention.

DESCRIPTION OF THE PADDING COMPOSITIONS

For the preparation of the base coat commercial Rhoplex resin emulsions sold by Rohm and Haas are useful. They follow the composition pattern in the following tabulation. Essential to the base coat for holding the dye in place is that it be a cross linked, acrylic copolymer. Apparently this structure of polymer holds the dye particles in place. Hence, in the following tabulation the combinations of ingredients among A through H are employed to provide a binder for the color pigment. The base coat material will not release soil and it will burn: Base Coat compositions:

| | | No. 1 | No. 2 | No. 3 |
|---|---|---|---|---|
| A | Ethyl Acrylate* | 16 | 20 | 22 |
| B | Vinyl Acetate* | 14 | | |
| C | Butyl Acrylate* | 12 | 22 | 20 |
| D | Methylol Acrylamide* 60% | 2 | 2 | 4 |
| E | Hydroxy Ethyl Methacrylate (30%)* | 0.5 | 0.5 | 1 |
| F | Sodium Acetate | 0.37 | 0.37 | 0.37 |
| G | Potassium Persulfate | 0.19 | 0.19 | 0.19 |
| H | Abex 18-S | 6.22 | 6.22 | 6.22 |
| I | Water | 50 | 50 | 50 |

Water is put into a closed reactor equipped with reflux then H and F are added. Three feed tanks are prepared. No. 1 has A, B and C mixed together. No. 2 has D and E mixed together. No. 3 has a solution of the catalyst G. Ten percent of tank No. 1 and tank No. 2 are added to the reactor with agitation and it is heated to 140° to 150° F. and all tanks are then pumped proportionate into the kettle over a period of 2 hours. The reaction is allowed to proceed until no more heat is generated the mixture is cooled.

*Monomers

The aqueous emulsion of water and copolymer of acrylic monomers for the first coat, and for the second coat are available as commercial resin latices. One source is the sequence of acrylic resins sold as "Rhoplex" by Rohm and Haas.

In the top coat I prefer an aqueous emulsion or a copolymer of acrylic or methacrylic esters, wherein there is a relatively high proportion of the acid. These are combined with the emulsifier which is an aqueous solution of alkyl phenol, nonyl or octyl phenol preferred, with 9 to 50 moles of ethylene oxide in a preferred version.

The silicone softener is also a known item of commerce and may be any one of the following: Arkolube Sil or an emulsion of a nonreactive silicone.

The fatty acid ester emulsifier is that which has been described and is defined in those terms. It is any fatty acid having eight to 20 carbon atoms, preferably those having 16 to 18 carbon atoms, such as stearic or oleic, reacted with ethylene oxide to the extent of taking up 10 to 50 moles of the ethylene oxide. The proportions of these ingredients which ought to be combined together to form the bath for padding purposes are not critical. It is important however, to have the bath of a total solids concentration for the padding technique, which is the conventional easy physical form of handling the materials to leave behind on the fabric an appropriate quantity of the resin and the fire retarding agent. The total deposit should not exceed about 4 to 4½ percent of the weight of the fabric.

What is claimed is:

1. A soil release system for glass fiber surfaces comprising the glass fiber surface, a base coat on said surface, and a second nonflammable soil release coat adhering to said base coat, whereby the finished system is essentially nonflammable;
   a. said base coat comprising a wash fast film dried and set on the bare glass fibers at a temperature of from 250-800° F., said film having been deposited from an aqueous dispersion consisting essentially of a cross-linked acrylic resin polymer and a softener, and
   b. said second coat having been deposited from an aqueous emulsion of
      1. a copolymer consisting of 25-80 mole percent of units derived from ethylenically unsaturated carboxylic acids or anhydrides and 20-75 mole percent of units derived from esters of acrylic or methacrylic acid
      2. a lower alkyl phenol reacted with 9-50 moles of ethylene oxide, and
      3. the reaction product of a fatty acid or fatty alcohol having from 8-26 carbon atoms with from 5-50 mole percent of ethylene oxide,
      and set at a temperature of about 350° F.

2. A system according to claim 1 where the concentration of the acrylic or methacrylic copolymer in the second coating is between 1 percent and 5 percent of the emulsion.

3. A system according to claim 1 wherein the emulsifier is nonyl or octyl phenol reacted with 9 to 50 moles of ethylene oxide, and is in the coating at a concentration between one-fourth and 10 percent on the weight of the solution.

4. A system according to claim 1 wherein the fatty acid or alcohol makes up between 0 to 10 percent of the weight of the solution.

5. A glass fabric characterized by its soil release system and its nonflammability comprising a fabric of texturized filament glass fibers said fabric carrying thereon a first coat and a second coat, said first coat comprising a film formed from a composition of
   1. 0.5 to 5 percent of a pigment padding dispersion,
   2. 3 to 12 percent of a cross-linking acrylic emulsion that is durable to washing
   3. 3 to 10 percent of a nonreactive silicone emulsion
   4. 0.5 to 2 percent of a metal salt catalyst and bonding agent for glass
   5. with water to make 100 percent which composition is deposited on said fabric and cured, and
wherein said first coat total add on of solids does not exceed 3 percent of the weight of the fibers;
said coat being set at a temperature of 250°-800° F., and
a second coat to impart soil release and nonflammability comprising the ingredients
   1. 5 to 20 percent of an emulsion of a copolymer consisting of 25-80 mole percent of units derived from ethylenically unsaturated carboxylic acids or anhydrides and 20-75 mole percent of units derived from esters of acrylic or methacrylic acid,
   2. 0 to 4 percent of a nonyl phenol with 9 to 50 moles ethylene oxide reacted therewith.

3. 0 to 4 percent of a fatty acid ester of 6 to 28 carbons reacted with 5 to 50 percent ethylene oxide, where the amounts of solids add on of said second coat does not exceed 1 to ½ percent on the weight of the fibers, and said coat being set at a temperature of about 350° F.